US 8,220,417 B2

(12) United States Patent
Arndt et al.

(10) Patent No.: US 8,220,417 B2
(45) Date of Patent: Jul. 17, 2012

(54) PERFORATED ROTATABLE PLATFORMS FOR ELEVATING ANIMALS IN A BATHING TUB

(76) Inventors: Mark S. Arndt, Omaha, NE (US); Jeanne L. Caples, Omaha, NE (US)

( * ) Notice: Subject to any disclaimer, the term of this patent is extended or adjusted under 35 U.S.C. 154(b) by 66 days.

(21) Appl. No.: 12/881,350

(22) Filed: Sep. 14, 2010

(65) Prior Publication Data

US 2011/0067645 A1 Mar. 24, 2011

Related U.S. Application Data

(60) Provisional application No. 61/242,269, filed on Sep. 14, 2009.

(51) Int. Cl.
*A01K 13/00* (2006.01)
(52) U.S. Cl. .............. 119/665; 119/673; 4/630
(58) Field of Classification Search .............. 119/602, 119/603, 604, 665, 161, 600, 650, 666–671, 119/165, 166, 673, 674, 676; 4/630, 656; 239/20, 23
See application file for complete search history.

(56) References Cited

U.S. PATENT DOCUMENTS

| 5,259,339 A | * | 11/1993 | McLaughlin | ............... 119/676 |
| 5,441,707 A | * | 8/1995 | Lewis et al. | .................. 422/300 |
| 7,080,608 B1 | * | 7/2006 | Arndt et al. | ................... 119/671 |
| 2007/0138314 A1 | * | 6/2007 | Weemhoff | ..................... 239/16 |

* cited by examiner

*Primary Examiner* — Rob Swiatek
*Assistant Examiner* — Lisa Tsang
(74) *Attorney, Agent, or Firm* — Holland & Hart LLP

(57) ABSTRACT

An apparatus for washing an animal with a liquid, includes a container having an open upper end portion, opposite end walls, opposite side walls, and a bottom wall. At least one pair of ledges extends from the opposite side walls above the bottom wall. One or more platforms are each provided with widths that are shorter than the lengths of the platforms, wherein the platforms may be passed through the container to the bottom wall when the platforms are turned in one direction or supported by the pair of ledges when the platforms are turned ninety degrees. Multiple pairs of ledges may be provided for varied platform levels within the container.

17 Claims, 6 Drawing Sheets

PERFORATED ROTATABLE PLATFORMS FOR ELEVATING ANIMALS IN A BATHING TUB

CROSS-REFERENCE TO RELATED PATENT APPLICATIONS

The invention claims priority from U.S. Provisional Patent Application No. 61/242,269 entitled Perforated Rotatable Platforms for Elevating Animals in a Bathing Tub by: Mark S. Arndt and Jeanne L. Caples, filed on Sep. 14, 2009, which Provisional Patent Application is hereby incorporated by reference in its entirety.

BACKGROUND

Various washing stations and tubs are used in the veterinary and commercial pet grooming industries to wash and disinfect a wide variety of animals. These systems typically employ a tub in which the animal can be placed and a source of water or other washing liquid that can be selectively directed to the animal using one of many types of hand sprayers. Such a system is typically provided with a drain, positioned in the bottom of the washing container to dispose of the washing liquid. Another typical feature of the prior art systems is a horizontal platform disposed within the container for supporting the animal above the standing washing liquid at the bottom of the container. However, since animals and their bathers come in different sizes, the elevation chosen for a perforated platform will not be ideal for every bathing situation.

Some prior washing stations have provided platforms that are made to stack atop one another, potentially providing the benefits of different levels at which to bathe animals. In other prior washing stations, perforated platforms are provided that can insert into the top of an animal bathing tub, forming a bridge that extends across from back to front at different levels. However, having stackable or insertable platforms can present a number of problems. Such platforms are typically large, heavy and awkward to handle. This is frequently a problem when bathing larger animals, where the stackable or insertable platforms are not used, as they need to be stored out of the way while they are not in use. The designs of most large washing stations provide little to no storage area for the bulky platforms. Even when a tub is designed to provide a place to accommodate storing platforms while not in use, the amount of space available is usually quite limited. Using the stackable or insertable platforms also requires additional pieces that are not in use much of the time.

SUMMARY

This Summary is provided to introduce a selection of concepts in a simplified form that are further described below in the Detailed Description. This Summary and the foregoing Background are not intended to identify key aspects or essential aspects of the claimed subject matter. Moreover, this Summary is not intended for use as an aid in determining the scope of the claimed subject matter.

A washing apparatus according to the present technology is provided with a container having an open upper end portion, opposite end walls, opposite side walls, and a bottom wall. At least one pair of ledges are cantilevered toward a middle portion of the container from the opposite side walls. One or more platforms are provided, having opposite end portions, opposite side portions, an upper surface, and a lower surface. In at least some embodiments, at least one pair of legs extends outwardly from the lower surface of the platform so that the platform may be vertically spaced from the bottom wall of the container when the legs rest against the bottom wall. In various embodiments of the platform, a plurality of drain apertures are provided to penetrate the platform such that fluid is allowed to drain freely from the upper surface.

In various embodiments, the width of the platform, extending between the opposite side portions, is insufficient in length to span an open interior width between distal edge portions of the pair of ledges. This enables the platform to be passed through the open upper end portion of the container, through the open interior width between the pair of ledges, to a bottom portion of the container, such that the platform rests on the bottom wall of the container. In some embodiments, however, the length of the platform is provided with a length sufficient to span the open interior width between the pair of ledges, such that the platform may be supported by the pair of ledges and prevented from passing completely through the open interior width between the pair of ledges.

In some embodiments, a plurality of platforms may be provided for use with the washing apparatus. In such embodiments, a second platform is provided that may be shaped like the first. The first and second platforms may be secured within the container in a number of different positions, according to the needs of the user and the size of the animal being washed within the washing apparatus. For example, both platforms may be supported by the bottom wall for larger animals or both supported by the ledges for smaller animals. The first platform and second platform may also be positioned to be at least slightly offset positions from one another in vertical alignment and horizontal alignment, defining a stepped, multi-planar support.

The washing apparatus may be provided with one or more pads that are shaped to be removably positioned on the upper surfaces of the platforms. In some embodiments, the pad is formed from a deformably resilient material. The material may be a water-resistant material such as a closed-cell foam rubber. In some embodiments, a plurality of apertures may be provided to penetrate the pad to enable fluids to freely pass from an upper surface of the pad to the platform and, ultimately, to the bottom wall of the container.

In some embodiments more than one pair of ledges may be associated with the washing apparatus. In at least one alternate embodiment, a second pair of ledges may be cantilevered toward a middle portion of the container from the opposite side walls of the container in an equidistant, spaced relationship from, and parallel with, the bottom wall. In some embodiments, the second pair of ledges are positioned between the first pair of ledges and the bottom wall of the container. In at least one embodiment, the ledges may be formed directly into the side walls of the container. In a particular example, the end cross-sectional shape of the container is gradually stepped, whereby the open upper end portion provides the widest interior width of the container and the bottom portion of the container, adjacent the bottom wall, provides the narrowest interior width. In this example, two or more pairs of ledges are positioned between the open upper end portion and the bottom portion of the container.

These and other aspects of the present system, methods of fabrication, and methods of use will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Figure 1:
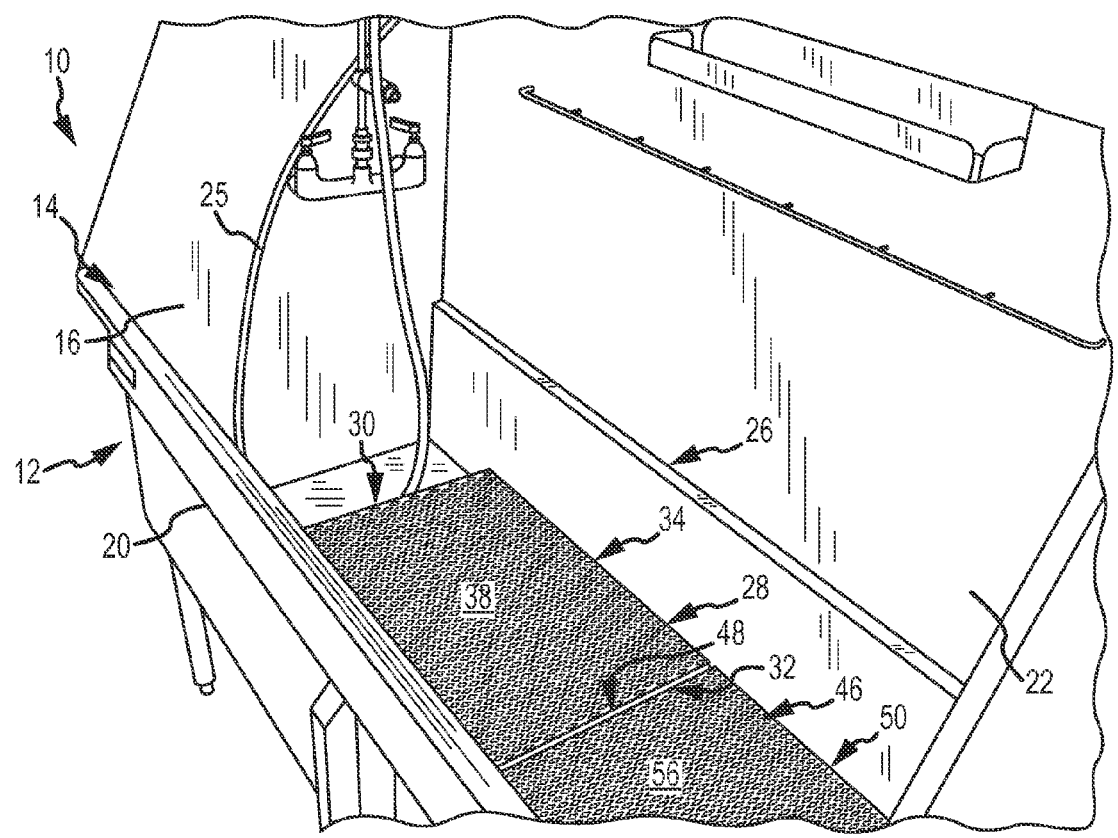
FIG. 1 depicts an isometric view of one embodiment of the present technology and demonstrates one manner in which the platforms may be placed in a lower position within a washing tub.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

With reference to FIGS. 1-6, a washing apparatus 10 is generally provided with a container 12 having an open upper end portion 14, a first end wall 16, a second end wall 18, a first side wall 20, a second side wall 22, and a bottom wall 24, which define an open interior of the container 12. The embodiments depicted in FIGS. 1-6 may be depicted with optional structures that may assist the user with one or more contemplated uses of the present invention; however, these structures may not be necessary to the technology as it is claimed herein. For example, a recirculating pump 23 may be disposed within the container 12 and associated with at least one fluid line 25 to selectively direct the liquid from the trough toward the animal. It is contemplated, however, that the washing apparatus may use a continual supply of fresh water, wherein the fluid line is coupled with a fluid supply and the fluids are allowed to continually leave the system through a drain assembly. Moreover, although the container 12 is shown to have a generally rectangular shape, virtually any shape is contemplated to fit the particular needs and applications of the user, from square to round to an oblong shape. It will be apparent how other component parts associated with the container 12 within the present technology will change in shape as the shape of the container 12 changes. In at least one embodiment, where a generally rectangular container 12 is provided, at least one pair of ledges 26 are cantilevered toward a middle portion of the container 12 from the opposite side walls 20 and 22. In various embodiments, the pair of ledges 26 are positioned in an equidistant, spaced relationship from and parallel with the bottom wall 24 of the container 12. It is contemplated, however, that the angular relationship of the ledges 26 with the bottom wall 24 may vary slightly according to one or more intended uses of the present technology. For example, in some embodiments, it will be desirable to dispose the bottom wall 24 at a slight angle toward a drain associated with the container 12 to assist in the draining of fluids during washing operations. However, it may be desirable to maintain the pair of ledges 26 in a generally horizontal orientation for supporting animals comfortably thereon.

In various embodiments of the technology, one or more platforms 28 are provided, having a first end portion 30, a second end portion 32, a first side portion 34, a second side portion 36, an upper surface 38, and a lower surface 40. In at least some embodiments, at least one pair of legs 42 extends outwardly from the lower surface 40 of the platform 28 so that the platform 28 may be vertically spaced from the bottom wall 24 of the container 12 when the legs 42 rest against the bottom wall 24. Various embodiments of the platform 28 may incorporate one or more structures to assist in the drainage of fluid from the upper surface 38 off of the platform 28 during washing operations. For example, with reference to FIGS. 1-3, a plurality of drain apertures 44 may be provided to penetrate the platform 28 such that fluid is allowed to drain freely from the upper surface 38. In other embodiments, it is contemplated that various grooves or channels (not depicted) may be associated with the platform 28 to provide the desired fluid drainage.

In various embodiments, the width of the platform 28, extending between the opposite side portions 34 and 36, is insufficient in length to span an open interior width between distal edge portions of the pair of ledges 26. This enables the platform 28 to be passed through the open upper end portion 14 of the container 12, through the open interior width between the pair of ledges 26, to a bottom portion of the container 12, such that the platform 28 rests on the bottom wall 24 of the container 12. In some embodiments, however, the length of the platform 28, extending between the opposite end portions 30 and 32, is provided with a length sufficient to span the open interior width between the pair of ledges 26, such that the platform 28 may be supported by the pair of ledges 26 and prevented from passing completely through the open interior width between the pair of ledges 26. In those embodiments, where one or more pairs of legs 42 extend from the platform 28, it will be desirable to space the legs 42 inwardly from the opposite end portions 30 and 32 such that the legs 42 do not prevent the lower surface 40 of the platform 28 from engaging and being supported by the pair of legs 42. In this orientation, the legs 42 are allowed to depend through the open interior width between the pair of ledges 26.

With reference to FIGS. 1-5, it is contemplated that a plurality of platforms 28 may be provided for use with the washing apparatus 10. In some embodiments, a second platform 46 is provided, having a first end portion 48, a second end portion 50, a first side portion 52, a second side portion 54, an upper surface 56, and a lower surface 58. One or more pairs of legs 60 may be provided to extend outwardly from the lower surface 58 of the second platform 46. The pairs of legs 60 may be positioned as described previously with respect to the platform 28 to permit the second platform 46 to be supported by the pair of ledges 26. In some embodiments, the width of the second platform, extending between the opposite side portions 52 and 54, is insufficient to span the open interior width between the pair of ledges 26. In this manner, the second platform 46 may be passed through the open upper end portion 14 of the container 12, through the open interior width between the pair of ledges 26, to a bottom portion of the container such that the second platform 46 may rest on the bottom wall 24. The length of the second platform 46, extending between the opposite end portions 48 and 50 of the second platform 46, will be provided having a length sufficient to span the open interior width between the pair of ledges 26 such that the second platform 46 may be supported by the pair of ledges 26 and prevented from passing completely through the open interior width between the ledges 26. It is contemplated that the second platform 46 will be provided with structural features to assist in the drainage of fluids from the upper surface 56 of the second platform 46, much in the way described previously regarding the platform 28. Accordingly, in some embodiments, apertures 62 are provided to penetrate the second platform 46 such that fluid is allowed to freely pass from the upper surface 56 of the second platform 46 to the bottom portion of the container 12.

Figure 2:
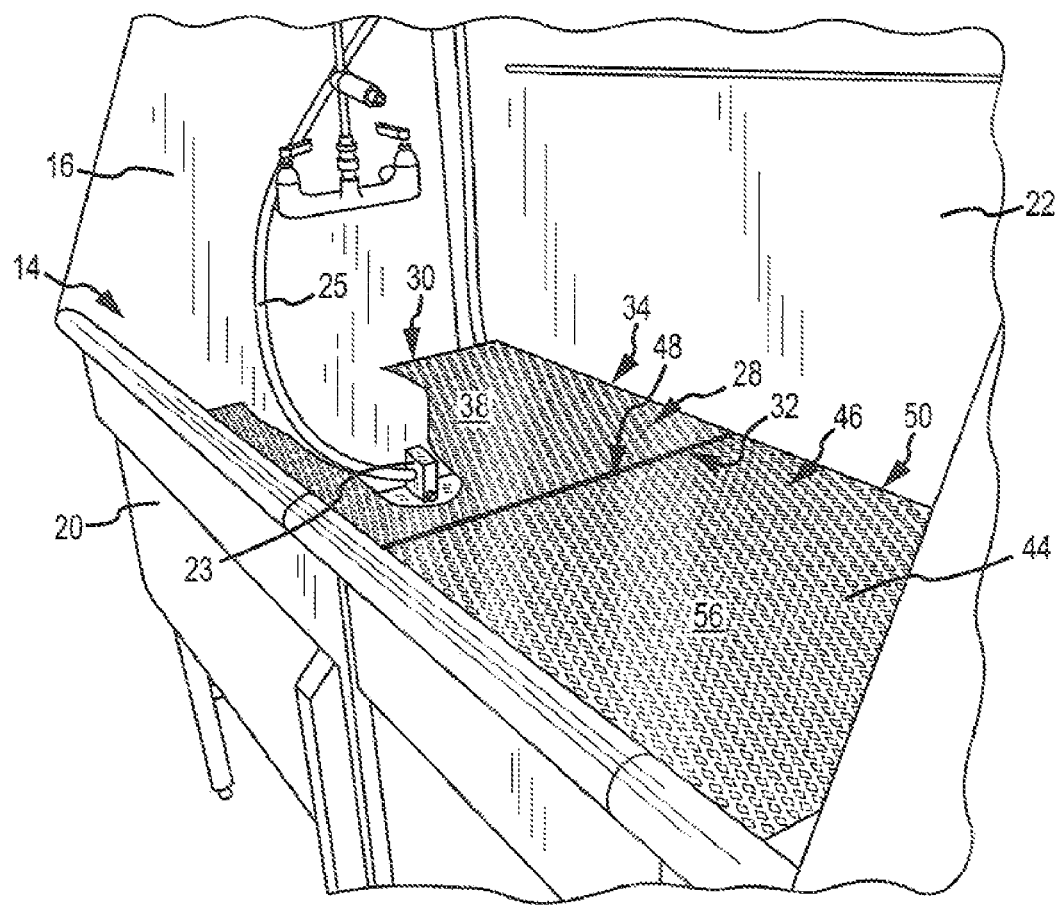
FIG. 2 depicts an isometric view of another embodiment of the present technology and demonstrates one manner in which the platforms may be placed in a higher position within a washing tub.
Figure 3:
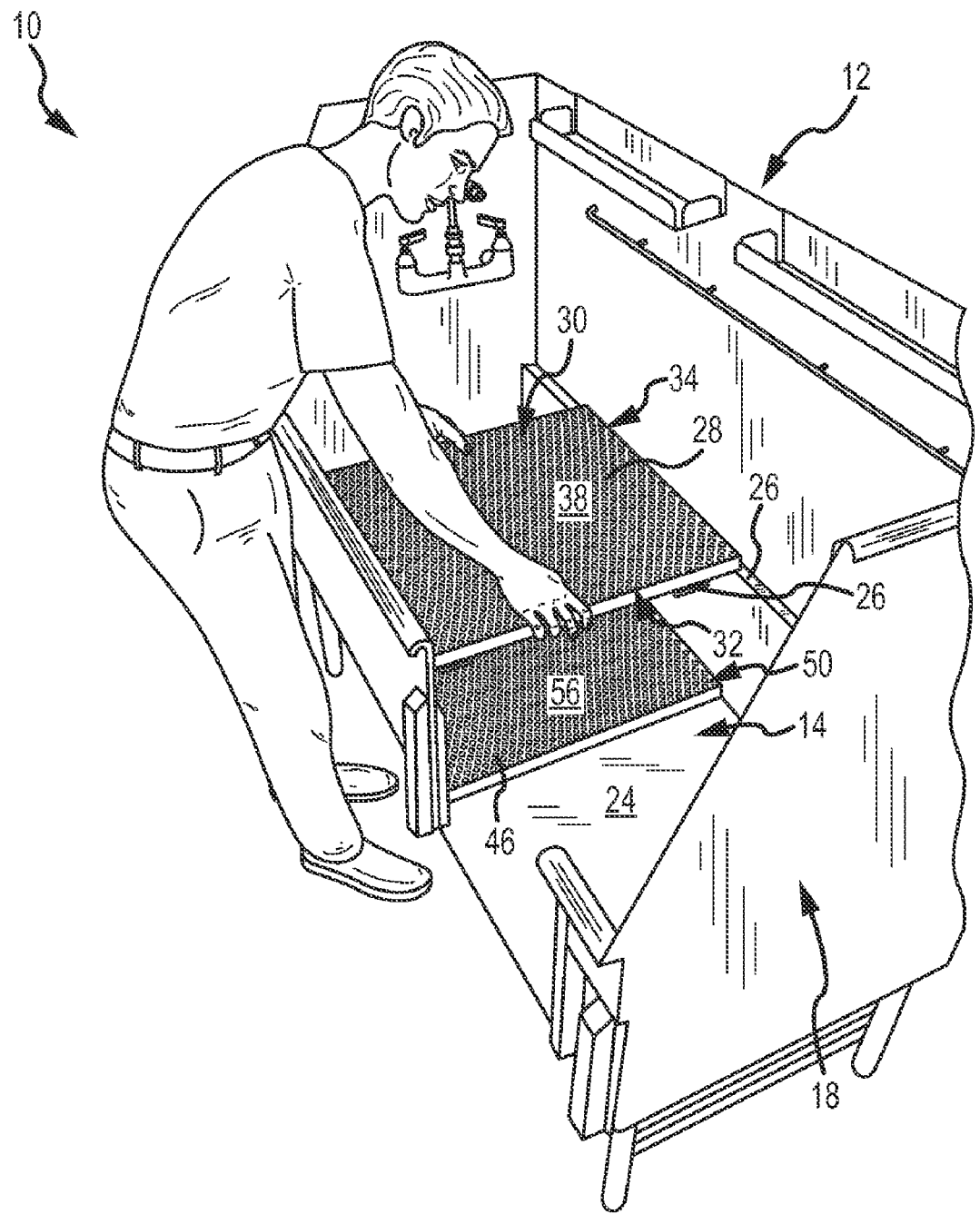
FIG. 3 depicts an isometric view of one manner in which a user may position one embodiment of the platforms into a washing tub in a stacked orientation with respect to one another.
Figure 4:
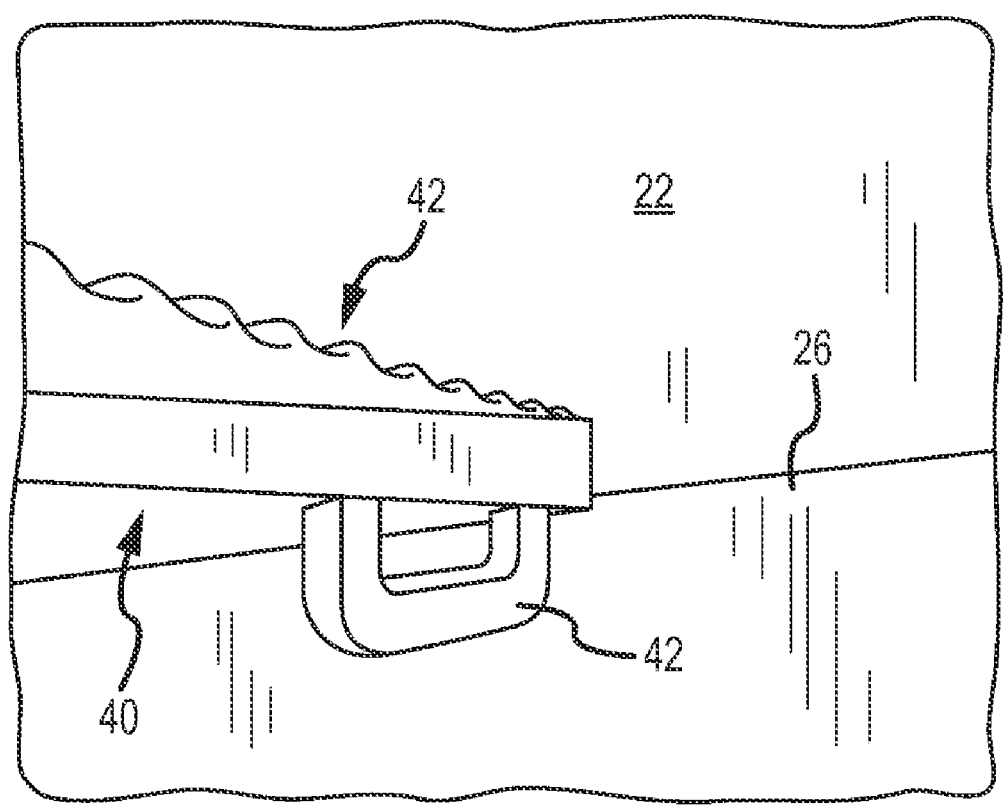
FIG. 4 depicts an isometric view of one manner in which a platform may engage a ledge within the washing tub.
Figure 5:
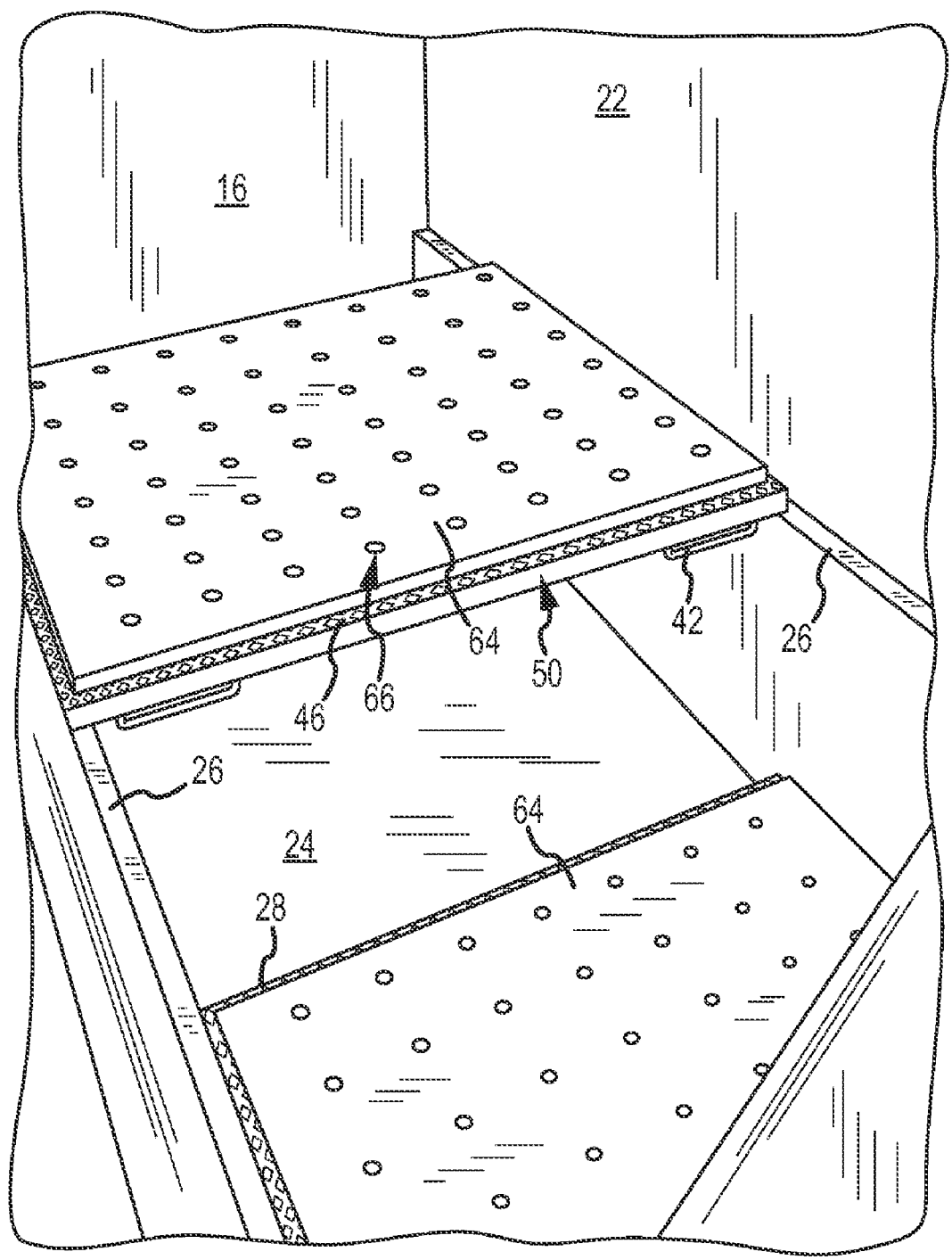
FIG. 5 depicts an isometric view of one manner in which a user may position one embodiment of the platforms into a washing tub in an off-set orientation with respect to one another.

The platform 28 and second platform 46 may be secured within the container 12 in a number of different positions, according to the needs of the user and the size of the animal being washed within the washing apparatus 10. With reference to FIG. 1, the platform 28 and second platform 46 may be supported by the bottom wall 24, in a spaced relationship with the bottom wall 24 by the pairs of legs 42 and 60. In this manner, a larger animal may be positioned on the upper surfaces of the platform 28 and second platform 46 and washed accordingly. With reference to FIG. 2, the platforms may be raised from the bottom wall 24 of the container 12, above the pair of ledges 26 and rotated 90 degrees so that their end portions engage the ledges 26, supporting the platform 28 and second platform 46 thereon. The end portions of the platform 28 and second platform 46 may be placed closely adjacent to one another to provide a single, elongated platform for washing smaller animals. With reference to FIG. 3, it may be desirable to provide a shorter length platform on which smaller animals may be washed in an upper end portion of the container 12. In such situations, it will be convenient to place the second platform 46 on the bottom wall 24 of the container 12 and simply position the platform 28 on the pair of ledges 26 above the second platform 46. In this manner, the second platform is effectively stored without requiring additional storage space outside of the washing apparatus 10. With reference to FIG. 5, the platform 28 and second platform 46 may be positioned to provide a stepped orientation with respect to one another, enabling a smaller animal to walk into the container 12 and step up to the platform 28 as it is secured with the pair of ledges 26 but spaced apart from the second platform 46, which is coupled with the bottom wall 24, and not positioned completely beneath the platform 28. Where the platform 28 and second platform 46 are positioned to be at least slightly offset from one another in vertical alignment, the platform 28 and second platform 46 define a stepped, multi-planar support enabling animals to walk into the washing apparatus 10 directly onto the second platform 46 and up to the platform 28 without having to walk on the bottom wall 24 of the container 12, which may be slippery from prior washings or cleaning of the washing apparatus 10.

These varied arrangements also allow for different procedures to be performed on the same animal when different levels are required or otherwise desirable. For example, it is generally desirable for an animal to be bathed in a more confined area (and at a lower level), allowing for better containment of water that might be splashed, sprayed, or shaken during the bathing process. Then, when both platforms 28 and 46 are deployed to a higher level, additional basic grooming functions (including drying, brushing, and basic ear and nail care procedures, among other things). can be more comfortably and efficiently performed, using a single piece of equipment. The benefit of being able to perform these activities in the same area (but at the higher level) is that it saves space, and it does not require additional investment in other equipment, such as a grooming table. This is particularly important, where space is limited or at a premium (such as in a mobile grooming van, for example). It is also important in those situations where an animal needs cleaning or basic care between regular groomings, such as dogs involved in security, law enforcement, and search and rescue activities. These animals often will become dirty and/or require basic care as a result of performing their normal jobs. Having a single piece of equipment that can be used for this kind of care is both cost and space efficient.

With reference to FIG. 5, the washing apparatus 10 may be provided with one or more pads 64 that are shaped to be removably positioned on the upper surfaces of the platform 28 and/or the second platform 46. In some embodiments, the pad 64 is formed from a deformably resilient material that will provide a level of comfort to the animal being supported thereon. In some embodiments, the material may be a water-resistant material such as a closed-cell foam rubber. However, it is contemplated that other natural and synthetic materials may provide a suitable pad 64 for use with the present technology. In at least one specific embodiment, however, a closed cell nitrile foam rubber pad 64 is used having a non-slip surface formed into its opposite surfaces. This material is used for its ability to resist stains, odors, and liquids. Moreover, such materials resist damage by detergents, disinfectants, and bleach. Such materials may also be desirable for their ability to resist wear and tear caused by engagement with the animals feet and nails. In some embodiments, a plurality of apertures 66 may be provided to penetrate the pad 64 to enable fluids to freely pass from an upper surface of the pad 64 to the platform 28 and, ultimately, to the bottom wall 24 of the container 12.

Figure 6:
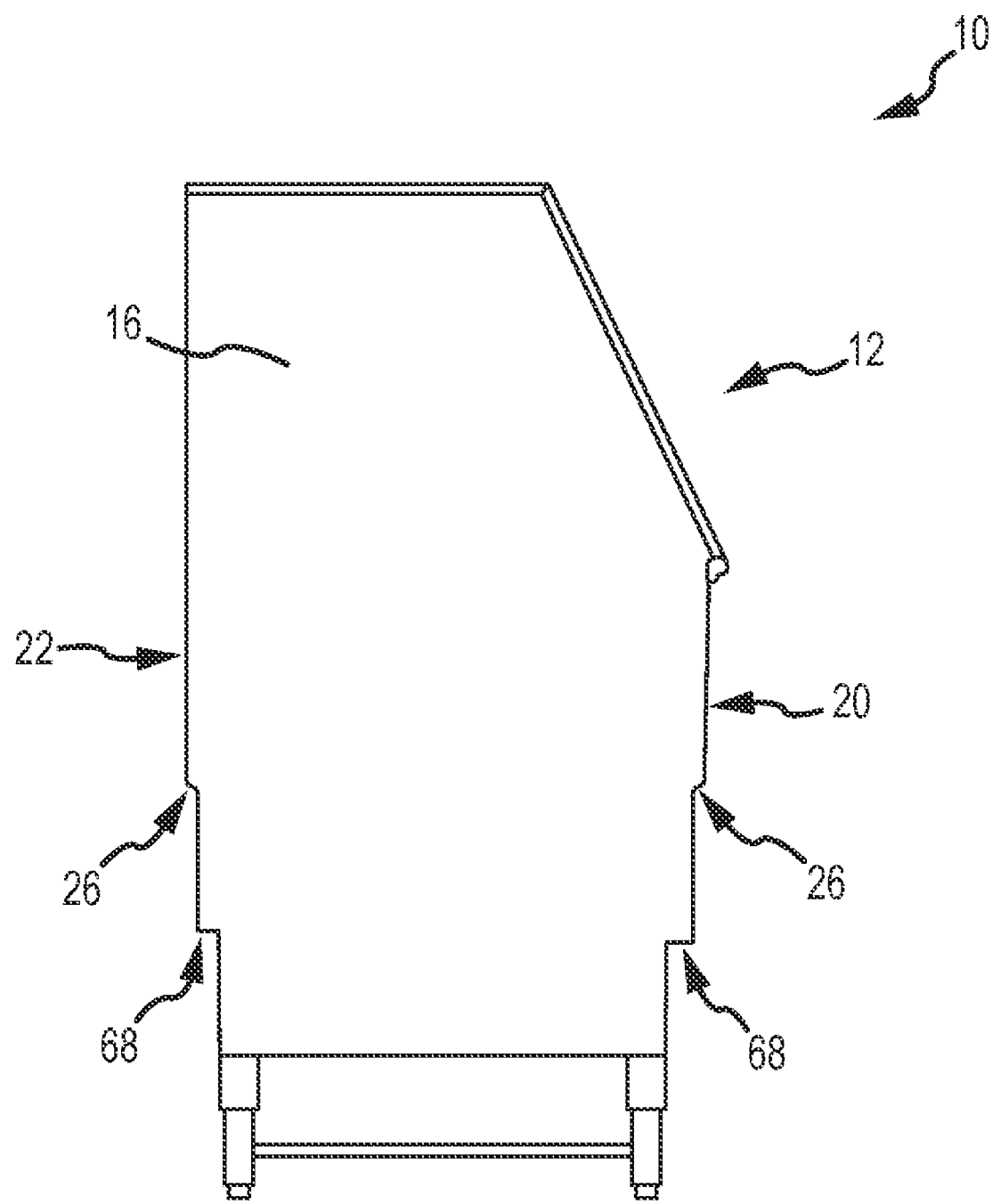
FIG. 6 depicts a side elevation view of one embodiment of the washing tub of the present technology.

It is contemplated that more than one pair of ledges 26 may be associated with the washing apparatus 10. In at least one alternate embodiment, a second pair of ledges 68 may be cantilevered toward a middle portion of the container 12 from the opposite side walls 20 and 22 of the container 12. As with the pair of ledges 26, the second pair of ledges 68 will be positioned in an equidistant, spaced relationship from and parallel with the bottom wall 24 of the container 12. The second pair of ledges 68 will be laterally spaced apart from one another by a second open interior width. In the present embodiment, the second pair of ledges 68 are positioned between the first pair of ledges 26 and the bottom wall 24 of the container 12. While such an arrangement provides a single additional level of support above the bottom wall 24, it is contemplated that a plurality of pairs of ledges may be disposed between the bottom wall 24 and the first pair of ledges 26. It is contemplated that the pairs of ledges 26 and 68 may be provided by attaching separate strips of material to the side walls 22 and 24 of the container 12. Where the container 12 is made from a metal, such as stainless steel, aluminum, and the like, the ledges 26 and 68 may be secured using mechanical fasteners or by other known techniques, such as welding and the like. However, in one embodiment, the ledges 26 and 68 may be formed directly into the side walls 20 and 22 of the container 12. In one particular example, the side walls 20 and 22 are formed from sheets of metal material that may be bent at approximate 90 degree angles to form the ledges, such as with a metal braking machine. In this particular example, such as depicted in FIG. 6, the end cross-sectional shape of the container 12 is gradually stepped whereby the open upper end portion 14 provides the widest interior width of the container 12 and the bottom portion of the container 12, adjacent the bottom wall 24, provides the narrowest interior width. In this example, the second platform 46 may be provided to have a width similar to that of the platform 28, whereby both platforms are able to rest on the bottom wall 24 of the container 12. However, the lengths of the platform 28 and second platform 46 may be provided to be slightly different such that the length of the second platform is provided to be insufficient to span the open interior width between the first pair of ledges 26 but sufficient to span the second open interior width between the second pair of ledges 68, whereby the second platform 46 may be supported by the second pair of ledges 68 and prevented from passing through the second open interior width between the second pair of ledges 68.

Accordingly, it will be appreciated that the present technology and in its various embodiments and methods of use provide at least one or more of the following advantages:

Provides animal washing tub and platform technology that may be used with animals of various sizes.

Provides an animal washing station that includes platforms that are made to be positioned one above another, potentially providing the benefits of different levels at which to bathe animals, without stacking the platforms on one another.

Provides an animal washing station that includes perforated platforms that are inserted into the top of an animal bathing tub and serves the same purpose of elevating the animal to a more desirable level in a particular situation.

Provides an animal washing station that resolves the issue of where to store removable platforms.

Provides an animal washing station that allows for different procedures to be performed on an animal where different levels may be desired for one or more of the procedures.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An apparatus for washing an animal with a liquid, comprising:

a container having an open upper end portion, a length extending between opposite end walls, a width extending between opposite side walls, and a bottom wall; at least one pair of ledges extend toward a middle portion of the container from the opposite side walls; the at least one pair of ledges being positioned in an equidistant, spaced relationship from and parallel with the bottom wall of the container; the at least one pair of ledges being laterally spaced apart from one another by an open interior width; and a platform having a length extending between opposite end portions, a width extending between opposite side portions, a lower surface and an upper surface; the width of the platform being shorter than the length of the platform;

the width of the platform being insufficient to span the open interior width such that the platform may be passed: (i) through the open upper end portion of the container; (ii) through the open interior width of the container; and (iii) to a bottom portion of the container such that the platform rests on the bottom wall;

the length of the platform being sufficient to span the open interior width such that the platform may be supported by the at least one pair of ledges and prevented from passing completely through the open interior width of the container;

at least one pair of legs extends outwardly from the lower surface of the platform so that the platform is vertically spaced from the bottom wall of the container when the at least one pair of legs rests on the bottom wall.

2. The apparatus for washing an animal of claim 1 wherein: the at least one pair of legs are spaced inwardly from the opposite end portions such that the legs do not prevent the lower surface of the platform from engaging and being supported by the at least one pair of ledges while the at least one pair of legs depends through the open interior width of the container.

3. The apparatus for washing an animal of claim 1 further comprising:

a second platform having a length extending between opposite end portions, a width extending between opposite side portions, a lower surface and an upper surface; the width of the second platform being shorter than the length of the second platform;

the width of the second platform being insufficient to span the open interior width such that the second platform may be passed: (i) through the open upper end portion of the container; (ii) through the open interior width of the container; and (iii) to a bottom portion of the container such that the second platform rests on the bottom wall; and the length of the second platform being sufficient to span the open interior width such that the second platform may be supported by the at least one pair of ledges and prevented from passing completely through the open interior width of the container.

4. The apparatus for washing an animal of claim 1 wherein: a plurality of drain apertures penetrate the platform such that fluid is allowed to drain freely from the upper surface of the platform.

5. The apparatus for washing an animal of claim 1 further comprising:

a pad of deformably resilient material removably positioned on the upper surface of the platform; the pad having a plurality of apertures penetrating the pad whereby fluid is allowed to freely pass from an upper surface of the pad through the apertures.

6. The apparatus for washing an animal of claim 1 further comprising:
a recirculating pump disposed within the container; the recirculating pump being operatively coupled to at least one fluid line to selectively direct the fluid toward the animal.

7. An apparatus for washing an animal with a liquid, comprising:
a container having an open upper end portion, a length extending between opposite end walls, a width extending between opposite side walls, and a bottom wall; at least one pair of ledges extend toward a middle portion of the container from the opposite side walls; the at least one pair of ledges being positioned in an equidistant, spaced relationship from and parallel with the bottom wall of the container; the at least one pair of ledges being laterally spaced apart from one another by an open interior width;
a first platform having a length extending between opposite end portions, a width extending between opposite side portions, a lower surface and an upper surface; the width of the first platform being shorter than the length of the first platform;
the width of the first platform being insufficient to span the open interior width such that the first platform may be passed: (i) through the open upper end portion of the container; (ii) through the open interior width of the container; and (iii) to a bottom portion of the container such that the first platform rests on the bottom wall;
the length of the first platform being sufficient to span the open interior width such that the first platform may be supported by the at least one pair of ledges and prevented from passing completely through the open interior width of the container; and
a second platform having a length extending between opposite end portions, a width extending between opposite side portions, a lower surface and an upper surface; the width of the second platform being shorter than the length of the second platform;
the width of the second platform being insufficient to span the open interior width such that the second platform may be passed: (i) through the open upper end portion of the container; (ii) through the open interior width of the container; and (iii) to a bottom portion of the container such that the second platform rests on the bottom wall;
the length of the second platform being sufficient to span the open interior width such that the second platform may be supported by the at least one pair of ledges and prevented from passing completely through the open interior width of the container;
at least one pair of legs extends outwardly from the lower surface of the second platform so that the second platform is vertically spaced from the bottom wall of the container when the at least one pair of legs rests on the bottom wall;
the at least one pair of legs being spaced inwardly from the opposite end portions such that the legs do not prevent the lower surface of the second platform from engaging and being supported by the at least one pair of ledges while the at least one pair of legs depends through the open interior width of the container.

8. The apparatus for washing an animal of claim 7 wherein:
the platform is supported above the bottom floor by the at least one pair of ledges; and the at least one pair of legs of the second platform are engaged with the bottom wall of the container and supporting the second platform in a vertically spaced-apart relationship with the bottom wall of the container;
the platform and second platform being positioned at different heights above the bottom wall.

9. The apparatus for washing an animal of claim 8 wherein:
the platform and second platform are positioned to be at least slightly offset from one another in a vertical alignment, whereby the platform and second platform define a stepped, multi-planar support.

10. The apparatus for washing an animal of claim 7 wherein:
the platform is supported above the bottom floor by the at least one pair of ledges; and
the second platform is supported above the bottom floor by the at least one pair of ledges;
end portions of the platform and second platform being positioned closely adjacent one another, whereby the platform and second platform define a co-planar support above the bottom wall.

11. The apparatus for washing an animal of claim 7 wherein:
the at least one pair of legs of the platform are engaged with the bottom wall of the container and supporting the platform in a vertically spaced-apart relationship with the bottom wall of the container; and
the at least one pair of legs of the second platform are engaged with the bottom wall of the container and supporting the second platform in a vertically spaced-apart relationship with the bottom wall of the container;
end portions of the platform and second platform being positioned closely adjacent one another, whereby the platform and second platform define a co-planar support above the bottom wall.

12. An apparatus for washing an animal with a liquid comprising:
a container having an open upper end portion, a length extending between opposite end walls, a width extending between opposite side walls, and a bottom wall; at least one pair of ledges extend toward a middle portion of the container from the opposite side walls; the at least one pair of ledges being positioned in an equidistant, spaced relationship from, and parallel with, the bottom wall of the container; the at least one pair of ledges being laterally spaced apart from one another by an open interior width; and
a first platform having a length extending between opposite end portions, a width extending between opposite side portions, a lower surface and an upper surface; the width of the first platform being shorter than the length of the first platform;
the width of the first platform being insufficient to span the open interior width such that the first platform may be passed: (i) through the open upper end portion of the container; (ii) through the open interior width of the container; and (iii) to a bottom portion of the container such that the first platform rests on the bottom wall;
the length of the first platform being sufficient to span the open interior width such that the first platform may be supported by the at least one pair of ledges and prevented from passing completely through the open interior width of the container;
a second platform having a length extending between opposite end portions, a width extending between opposite side portions, a lower surface and an upper surface;

the width of the second platform being shorter than the length of the second platform;

at least a second pair of ledges extend toward a middle portion of the container from the opposite side walls; the second pair of ledges being positioned in an equidistant, spaced relationship from, and parallel with, the bottom wall of the container; the second pair of ledges being laterally spaced apart from one another by a second open interior width; the second pair of ledges being positioned between the first pair of ledges and the bottom wall;

the width of the second platform being insufficient to span the open interior widths of either the first or second pair of ledges such that the second platform may be passed: (i) through the open upper end portion of the container; (ii) through the open interior widths of both the first and second pair of ledges; and (iii) to a bottom portion of the container such that the second platform rests on the bottom wall; and the length of the second platform being insufficient to span the open interior width between the first pair of ledges but sufficient to span the second open interior width between the second pair of ledges such that the second platform may be supported by the second pair of ledges and prevented from passing through the second open interior width of the container.

13. An apparatus for washing an animal with a liquid, comprising:

a container having an open upper end portion, a length extending between opposite end walls, a width extending between opposite side walls, and a bottom wall; at least one pair of ledges extend toward a middle portion of the container from the opposite side walls; the at least one pair of ledges being positioned in an equidistant, spaced relationship from, and parallel with, the bottom wall of the container; the at least one pair of ledges being laterally spaced apart from one another by an open interior width;

at least two platforms, each having a length extending between opposite end portions, a width extending between opposite side portions, a lower surface and an upper surface; the widths of the platforms being shorter than the lengths of the platforms; a plurality of drain apertures penetrating the platforms such that fluid may be allowed to drain freely from the upper surfaces of the platforms;

at least one pair of legs extending outwardly from the lower surfaces of the platforms; the at least one pair of legs are spaced inwardly from the opposite end portions such that the legs do not prevent the lower surface of the platform from engaging and being supported by the at least one pair of ledges;

the width of the platforms being insufficient to span the open interior width such that the platforms may be passed: (i) through the open upper end portion of the container; (ii) through the open interior width of the container; and (iii) to a bottom portion of the container such that the at least one pair of legs of the platforms rests on the bottom wall, such that the platforms are placed in a vertically spaced-apart relationship with the bottom wall; and the length of the platforms being sufficient to span the open interior width such that the platforms may be removably supported by the at least one pair of ledges and prevented from passing through the open upper end portion of the container.

14. The apparatus for washing an animal of claim 13 wherein:

the first platform is supported above the bottom floor by the at least one pair of ledges; and the at least one pair of legs of the second platform are engaged with the bottom wall of the container and supporting the second platform in a vertically spaced-apart relationship with the bottom wall of the container;

the first platform and second platform being positioned at different heights above the bottom wall.

15. The apparatus for washing an animal of claim 13 wherein:

at least a second pair of ledges extend toward a middle portion of the container from the opposite side walls; the second pair of ledges being positioned in an equidistant, spaced relationship from, and parallel with, the bottom wall of the container; the second pair of ledges being laterally spaced apart from one another by a second open interior width; the second pair of ledges being positioned between the first pair of ledges and the bottom wall;

the width of the second platform being insufficient to span the open interior widths of either the first or second pair of ledges such that the second platform may be passed: (i) through the open upper end portion of the container; (ii) through the open interior widths of both the first and second pair of ledges; and (iii) to a bottom portion of the container such that the second platform rests on the bottom wall; and the length of the second platform being insufficient to span the open interior width between the first pair of ledges but sufficient to span the second open interior width between the second pair of ledges such that the second platform may be supported by the second pair of ledges and prevented from passing through the second open upper end portion of the container.

16. The apparatus for washing an animal of claim 13 further comprising:

a pad of deformably resilient material removably positioned on the upper surface of at least one of the platforms; the pad having a plurality of apertures penetrating the pad whereby fluid is allowed to freely pass from an upper surface of the pad through the apertures.

17. The apparatus for washing an animal of claim 13 further comprising:

a recirculating pump disposed within the container; the recirculating pump being operatively coupled to at least one fluid line to selectively direct the fluid toward the animal.

* * * * *